(12) United States Patent
Suciu et al.

(10) Patent No.: US 9,982,599 B2
(45) Date of Patent: May 29, 2018

(54) DUAL FILTRATION PARTICLE SEPARATOR

(71) Applicant: United Technologies Corporation, Hartford, CT (US)

(72) Inventors: Gabriel L. Suciu, Glastonbury, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 341 days.

(21) Appl. No.: 14/443,145

(22) PCT Filed: Jun. 20, 2013

(86) PCT No.: PCT/US2013/046687
§ 371 (c)(1),
(2) Date: May 15, 2015

(87) PCT Pub. No.: WO2014/092778
PCT Pub. Date: Jun. 19, 2014

(65) Prior Publication Data
US 2015/0292408 A1 Oct. 15, 2015

Related U.S. Application Data

(60) Provisional application No. 61/735,268, filed on Dec. 10, 2012.

(51) Int. Cl.
*F02C 7/052* (2006.01)
*B01D 46/00* (2006.01)
*F02C 7/12* (2006.01)

(52) U.S. Cl.
CPC .......... *F02C 7/052* (2013.01); *B01D 46/0023* (2013.01); *F02C 7/12* (2013.01);
(Continued)

(58) Field of Classification Search
CPC ........ F02C 7/052; F02C 7/12; B01D 46/0023; F01D 25/32
See application file for complete search history.

(56) References Cited

U.S. PATENT DOCUMENTS 3,970,439 A 7/1976 Murphy
3,993,463 A 11/1976 Barr
(Continued)

FOREIGN PATENT DOCUMENTS

EP 0211513 A1 2/1987
EP 1978222 A2 10/2008
GB 2030650 A 4/1980

OTHER PUBLICATIONS

Supplementary European Search Report for European Application No. 13862563.7 completed Dec. 3, 2015.
(Continued)

*Primary Examiner* — Richard Edgar
*Assistant Examiner* — John S Hunter
(74) *Attorney, Agent, or Firm* — Carlson, Gaskey & Olds, P.C.

(57) ABSTRACT

A gas turbine engine has a first particle separator stage including a surface for impacting air at outer periphery of an air flow passage, capturing impacted particles at the outer periphery, and routing captured particles towards a second particle separator stage. Air inward of the first particle separator stage passes towards a core of the engine. Cleaner air upstream of the second particle separator stage is utilized for an air function at a location other than the core engine. A particle discharge is disposed downstream of said second particle separator stage.

18 Claims, 5 Drawing Sheets

(52) U.S. Cl.
CPC .......... *F05D 2220/327* (2013.01); *F05D 2260/40311* (2013.01); *F05D 2260/607* (2013.01); *Y02T 50/675* (2013.01)

(56) References Cited

U.S. PATENT DOCUMENTS

| | | | |
|---|---|---|---|
| 4,212,595 A * | 7/1980 | Kuintzle, Jr. | F02C 7/052 |
| | | | 415/142 |
| 4,702,071 A * | 10/1987 | Jenkins | F02C 7/052 |
| | | | 415/121.2 |
| 4,704,145 A | 11/1987 | Norris et al. | |
| 4,928,480 A | 5/1990 | Oliver et al. | |
| 5,554,343 A | 9/1996 | Wade | |
| 9,003,759 B2 * | 4/2015 | Suciu | F01D 5/022 |
| | | | 60/39.092 |
| 2003/0024232 A1 | 2/2003 | Snyder | |
| 2003/0024233 A1 | 2/2003 | Snyder | |
| 2009/0145101 A1 * | 6/2009 | Suciu | F01D 5/022 |
| | | | 60/39.092 |
| 2011/0268563 A1 * | 11/2011 | Stretton | F01D 25/12 |
| | | | 415/179 |
| 2012/0159961 A1 | 6/2012 | Krautheim et al. | |
| 2014/0119903 A1 * | 5/2014 | Suciu | F02C 7/052 |
| | | | 415/177 |

OTHER PUBLICATIONS

International Preliminary Report on Patentability for International Application No. PCT/US2013/046687 dated Jun. 25, 2015.
Search Report and Written Opinion from corresponding PCT/US2013/046687.

* cited by examiner

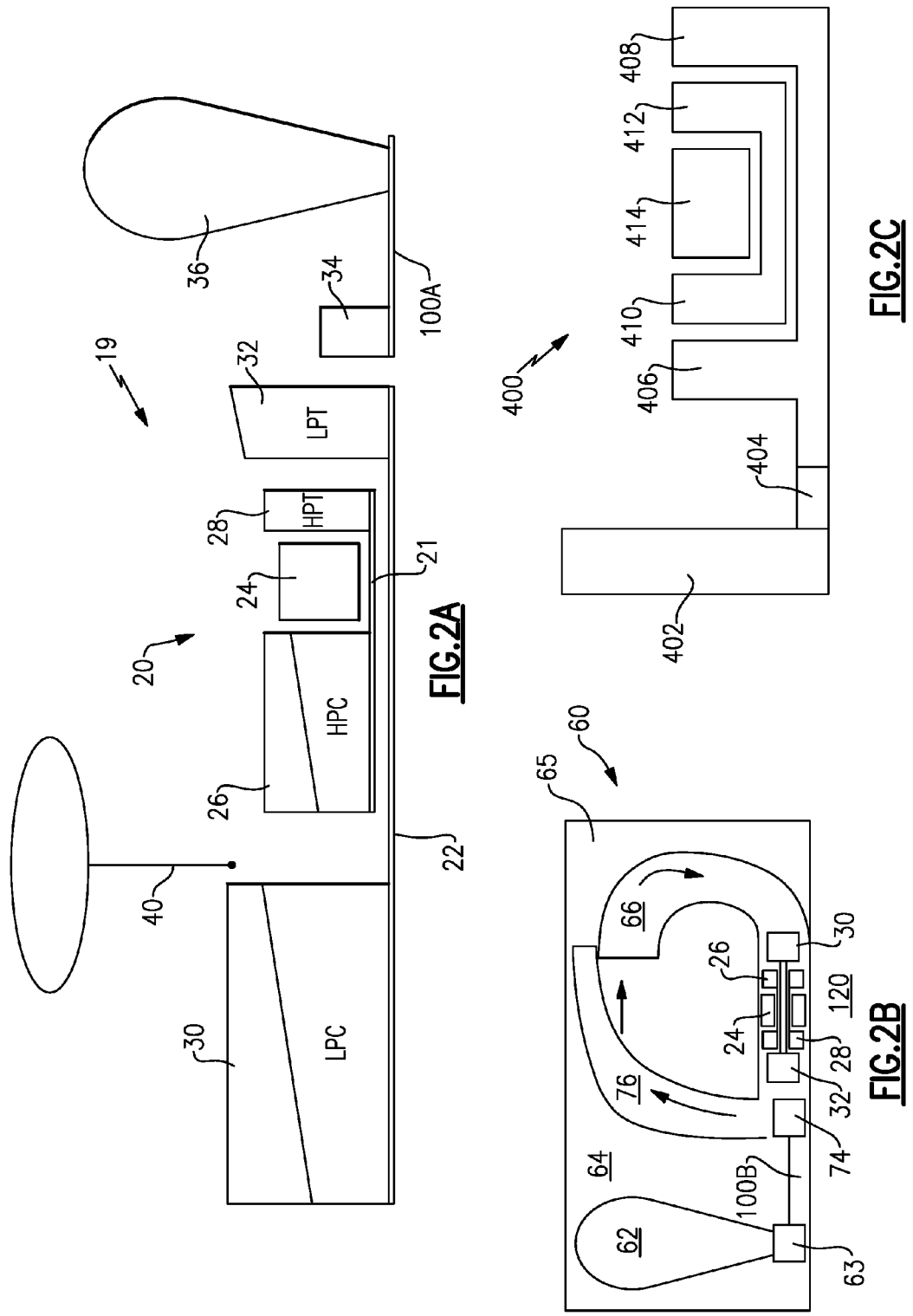

DUAL FILTRATION PARTICLE SEPARATOR

BACKGROUND

This application relates to a filter particle separator for use in a gas turbine engine.

Gas turbine engines typically need a good deal of air, such as for core air flow to support the combustion of fuel. In addition, air is utilized for various purposes such as cooling components on the engine. Finally, gas turbine engines utilized on the aircraft also supply air for use in the cabin of the aircraft. All of these applications require relatively clean air.

It is known to provide a particle separator that will separate impurities from ambient air. Generally, as the air is driven, impurities will tend to be thrown outwardly, and a particle separator is then positioned to remove those particles.

Historically, a fan drove air into the gas turbine engine. This fan has typically been driven at the same speed as a lower pressure compressor which is downstream of the fan. More recently, a gear reduction has been incorporated between the fan and the low pressure compressor, and the fan rotates at a slower speed compared to the low pressure compressor. With such engines, the air approaching the particle separator is moving at a slower speed than in the past, and there may not be particle separation as efficient as would be desirable.

SUMMARY

In a featured embodiment, gas turbine engine has a first particle separator stage including a surface for impacting air at outer periphery of an air flow passage, capturing impacted particles at the outer periphery, and routing captured particles towards a second particle separator stage. Air inward of the first particle separator stage passes towards a core of the engine. Cleaner air upstream of the second particle separator stage is utilized for an air function at a location other than the core engine. A particle discharge is disposed downstream of the second particle separator stage.

In another embodiment according to the previous embodiment, the particle separator includes a ring which provides the first particle separator stage, and which extends generally circumferentially to direct separated particles towards the second particle separator stage.

In another embodiment according to any of the previous embodiments, the second particle separator stage is generally located at a location spaced by 180° from a mount surface for an associated gas turbine engine.

In another embodiment according to any of the previous embodiments, the cleaner air for the air function passes over an air oil cooler heat exchanger.

In another embodiment according to any of the previous embodiments, the particle separator surrounds a nose cone. A path into the core engine is downstream and radially inwardly of the surface, and outwardly of the surface of the nose cone.

In another embodiment according to any of the previous embodiments, the cleaner air for the air function passes over an air oil cooler heat exchanger.

In another embodiment according to any of the previous embodiments, the particle separator surrounds a nose cone. A path into the core engine is downstream and radially inwardly of the surface, and outwardly of the surface of the nose cone.

In another embodiment according to any of the previous embodiments, the particle separator surrounds a nose cone. A path into the core engine is downstream and radially inwardly of the surface, and outwardly of the surface of the nose cone.

In another embodiment according to any of the previous embodiments, the core engine includes a turbine section, a compressor section and a propulsor section. There is at least two turbine rotors in the turbine section, a first and second compressor rotor, and a propulsor. The at least two turbine rotors each drive one of the first and second compressor rotors. The propulsor is not driven at the same speed as either of the first and second turbine rotors.

In another embodiment according to any of the previous embodiments, the propulsor is driven by one of the first and second turbine rotors which drives a lower stage one of the first and second compressor rotors. There is a gear reduction between one of the first and second turbine rotors and the propulsor.

In another embodiment according to any of the previous embodiments, the propulsor is driven by a third propulsor turbine rotor, which is positioned to be downstream of the at least two turbine rotors.

In another embodiment according to any of the previous embodiments, the second compressor rotor is downstream of the first compressor rotor. The second compressor rotor has a first overall pressure ratio. The first compressor rotor has a second overall pressure ratio. A ratio of the first overall pressure ratio to the second overall pressure ratio is greater than or equal to about 2.0.

In another embodiment according to any of the previous embodiments, the ratio of the first overall pressure ratio to the second overall pressure ratio is greater than or equal to about 3.0.

In another embodiment according to any of the previous embodiments, the ratio of the first overall pressure ratio to the second overall pressure ratio is greater than or equal to about 3.5.

In another embodiment according to any of the previous embodiments, the ratio of the first overall pressure ratio to the second overall pressure ratio is less than or equal to about 8.0.

In another embodiment according to any of the previous embodiments, the propulsor turbine drives a fan at an upstream end of the engine.

In another embodiment according to any of the previous embodiments, the ratio of the first overall pressure ratio to the second overall pressure ratio being less than or equal to about 8.0.

In another embodiment according to any of the previous embodiments, the propulsor turbine drives a fan at an upstream end of the engine.

In another embodiment according to any of the previous embodiments, an axially outer position is defined by the fan. The propulsor turbine is positioned between the fan and the first and second turbine rotors. The first and second compressor rotors are positioned further into the engine relative to the first and second turbine rotors.

In another embodiment according to any of the previous embodiments, the propulsor is a plurality of propellers.

These and other features can be best understood from the following specification and drawings.

BRIEF DESCRIPTION OF THE DRAWINGS

FIG. 2A schematically shows a three spool gas turbine engine.

FIG. 2B shows a second engine type.

FIG. 2C schematically shows another engine type.

DETAILED DESCRIPTION

The air to be delivered to the compressor of a gas turbine engine and to various uses, examples of which follow, must be relatively clean. As mentioned, the style of engines such as disclosed below raise challenges to providing clean air.

Figure 1A:
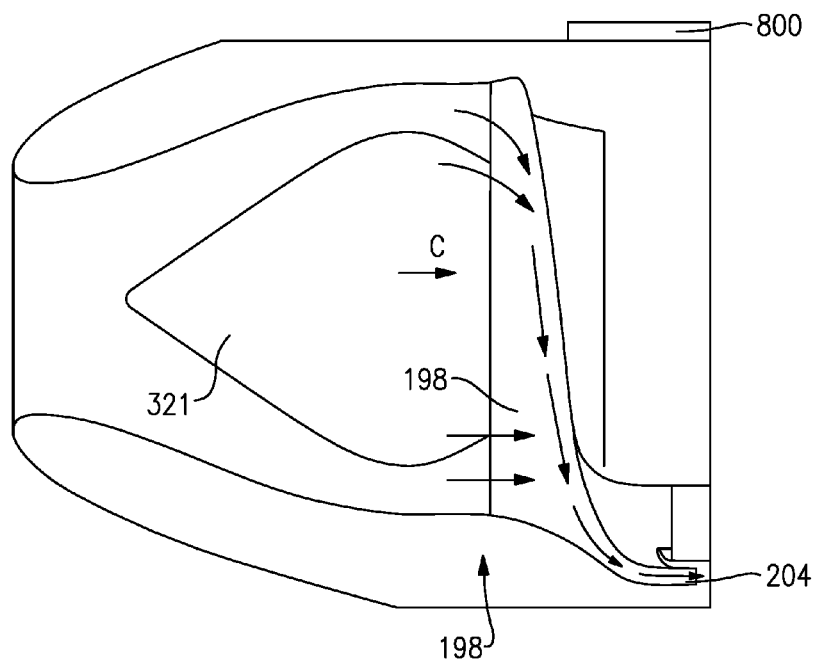
FIG. 1A shows a detail of a particle separator.
Figure 1B:
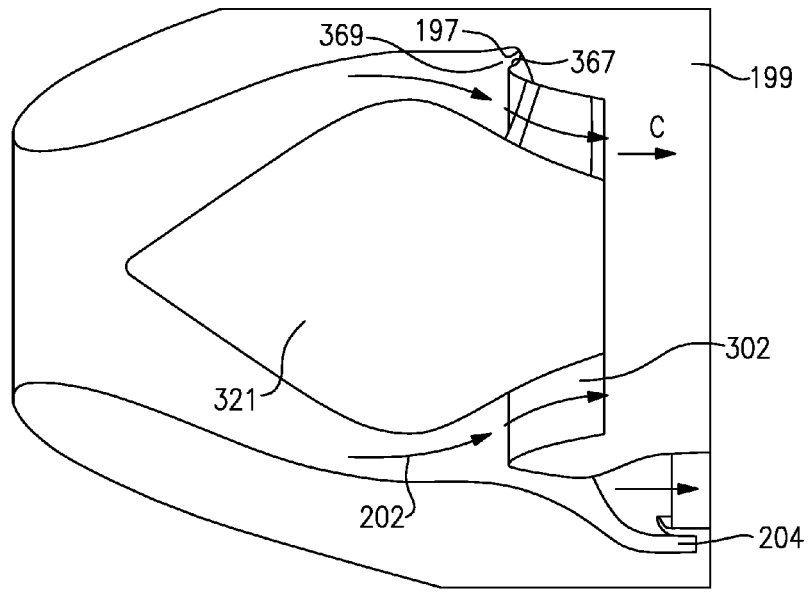
FIG. 1B shows another detail.

Thus, as shown in FIGS. 1A and 1B, a particle separator 198 has an internal cavity that receives core air flow C. The air flows around the outer periphery of the nose cone 321.

As can be appreciated from FIG. 1B, an internal passage 302 receives the core air flow downstream of the particle separator 198. As can also be appreciated from FIG. 1B, the separator 198 includes a radially outer surface 197 that includes a radially inner wall 367 to define a capture chamber 369 that catches heavier particles around the periphery of the particle separator 198. Air at the inlet location 202 would be cleaner towards radially inner locations, and include more dirt particles at radially outer locations, and those particles would tend to catch in the chamber 369.

Figure 1C:
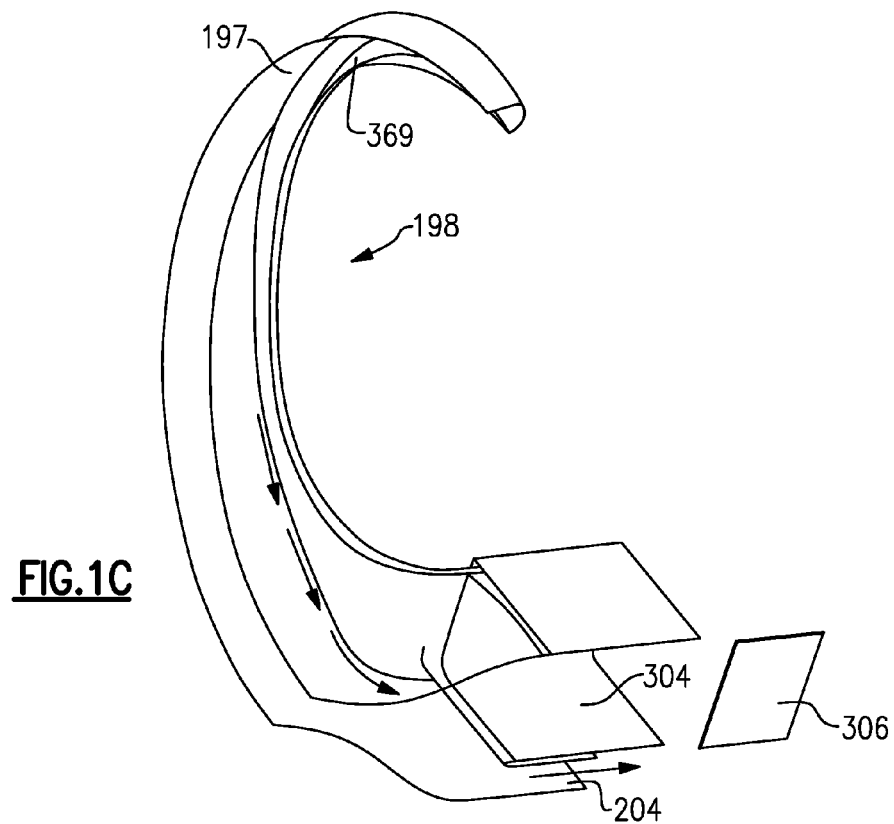
FIG. 1C shows features of the particle separator.

As shown in FIG. 1C, the chamber 369 within the surface 197 would tend to gather and force particles around the periphery of the particle separator 198 to gather in a lower location particle separator 204. Another flow path 314 will pass the heat exchanger 306, shown schematically, and such as disclosed below in the FIGS. 3 and 4 embodiments.

The lower location particle separator 204 provides a particle separator at a vertically lower location such that gravity will assist in removing the particles.

Figure 1D:
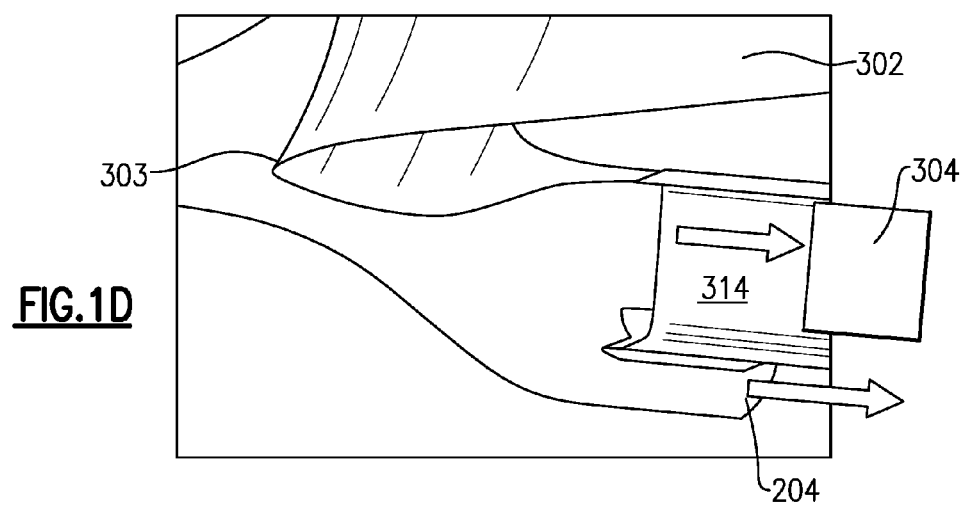
FIG. 1D shows a further detail.

As shown in FIG. 1D, the heat exchanger 306 will receive air that is somewhat dirtier than the core air delivered at 302, however, the dirtiest air would be delivered outwardly at particle separator portion 204. Downstream of particle separator 204, the air may be delivered for nacelle ventilation. Thus, there are two stages of particle separation, with the first stage directing cleaner air into the core than that delivered outwardly, and a second stage delivering cleaner air to the heat exchanger 306 than is directed into the particle separator 204.

As shown in FIG. 1A, a mount surface 800 may be associated with the engine to mount the engine to an aircraft. The particle separator 204 may be spaced by 180° relative to mount surface 800.

A gas turbine engine 19 is schematically illustrated in FIG. 2A. A core engine, or gas generator 20, includes a high speed shaft 21 as part of a high speed spool along with a high pressure turbine rotor 28 and a high pressure compressor rotor 26. A combustion section 24 is positioned intermediate the high pressure compressor rotor 26 and the high pressure turbine rotor 28. A shaft 22 of a low pressure spool connects a low pressure compressor rotor 30 to a low pressure turbine rotor 32.

Engine 19 also includes a free turbine 34 shown positioned downstream of the low pressure turbine rotor 32 and serving to drive a propeller 36.

Various embodiments are within the scope of the disclosed engine. These include embodiments in which:

a good deal more work is down by the low pressure compressor rotor 30 than is done by the high pressure compressor rotor 26;

the combination of the low pressure compressor rotor 30 and high pressure compressor rotor 26 provides an overall pressure ratio equal to or above about 30;

the low pressure compressor rotor 30 includes eight stages and has a pressure ratio at cruise conditions of 14.5;

the high pressure compressor rotor 26 had six stages and an overall pressure ratio of 3.6 at cruise;

a ratio of the low pressure compressor pressure ratio to the high pressure compressor ratio is greater than or equal to about 2.0, and less than or equal to about 8.0;

more narrowly, the ratio of the two pressure ratios is between or equal to about 3.0 and less than or equal to about 8;

even more narrowly, the ratio of the two pressure ratios is greater than about 3.5.

In the above embodiments, the high pressure compressor rotor 26 will rotate at slower speeds than in the prior art. If the pressure ratio through the fan and low pressure compressor are not modified, this could result in a somewhat reduced overall pressure ratio. The mechanical requirements for the high pressure spool, in any event, are relaxed.

With the lower pressure compressor 30 performing more of the compression, the high pressure turbine rotor 28 may include a single stage. In addition, the low pressure turbine rotor 32 may include two stages.

By moving more of the work to the low pressure compressor rotor 30, there is less work being done at the high pressure compressor rotor 26. In addition, the temperature at the exit of the high pressure compressor rotor 26 may be higher than is the case in the prior art, without undue challenges in maintaining the operation.

A bleed line or port 40 is positioned between the low pressure compressor rotor 30 and the high pressure compressor rotor 26. Details of this porting are disclosed below.

Variable vanes are less necessary for the high pressure compressor rotor 26 since it is doing less work. Moreover, the overall core size of the combined compressor rotors 30 and 26 is reduced compared to the prior art.

An alternative engine 60 as shown in FIG. 2B includes a two spool core engine 120 including a low pressure compressor rotor 30, a low pressure turbine rotor 32, a high pressure compressor rotor 26, and a high pressure turbine rotor 28, and a combustor 24 as in the prior embodiments. This core engine 120 is a so called "reverse flow" engine meaning that the compressor 30/26 is spaced further into the engine than is the turbine 28/32. Air downstream of the fan rotor 62 passes into a bypass duct 64, and toward an exit 65. However, a core inlet duct 66 catches a portion of this air and turns it to the low pressure compressor 30. The air is compressed in the compressor rotors 30 and 26, combusted in a combustor 24, and products of this combustion pass downstream over the turbine rotors 28 and 32. The products of combustion downstream of the turbine rotor 32 pass over a fan drive turbine 74. Then, the products of combustion exit through an exit duct 76 back into the bypass duct 64 (downstream of inlet 66 such that hot gas is not re-ingested into the core inlet 66), and toward the exit 65. A gear reduction 63 may be placed between the fan drive turbine 74 and fan 62.

The engines 19 and 60 are similar in that they have what may be called a propulsor turbine (34 or 74) which is spaced to be axially downstream of the low pressure turbine rotor 32. Further, the high pressure spool radially surrounds the low pressure spool, but neither of the spools surround the propulsor turbine, nor the shaft 100 connecting the propulsor turbine to the propellers 36 or fan 62. In this sense, the propulsor rotor is separate from the gas generator portion of the engine.

Another engine embodiment 400 is illustrated in FIG. 2C. In embodiment 400, a fan rotor 402 is driven by a fan drive turbine 408 through a gear reduction 404. A lower pressure compressor 406 is also driven by the fan drive turbine 408. A high pressure turbine 412 drives a high pressure compressor 410. A combustor section 414 is located between the compressor sections 406/410 and turbine sections 412/408. In such engines, the fan 402 now rotates at a slower speed than it would have in a direct drive engine.

All of the engines illustrated in FIGS. 2A, 2B, and 2C lack a high speed fan delivering air into the inlet of the engine. As such, they all face the challenges with regard to particle separation mentioned above.

Figure 3:
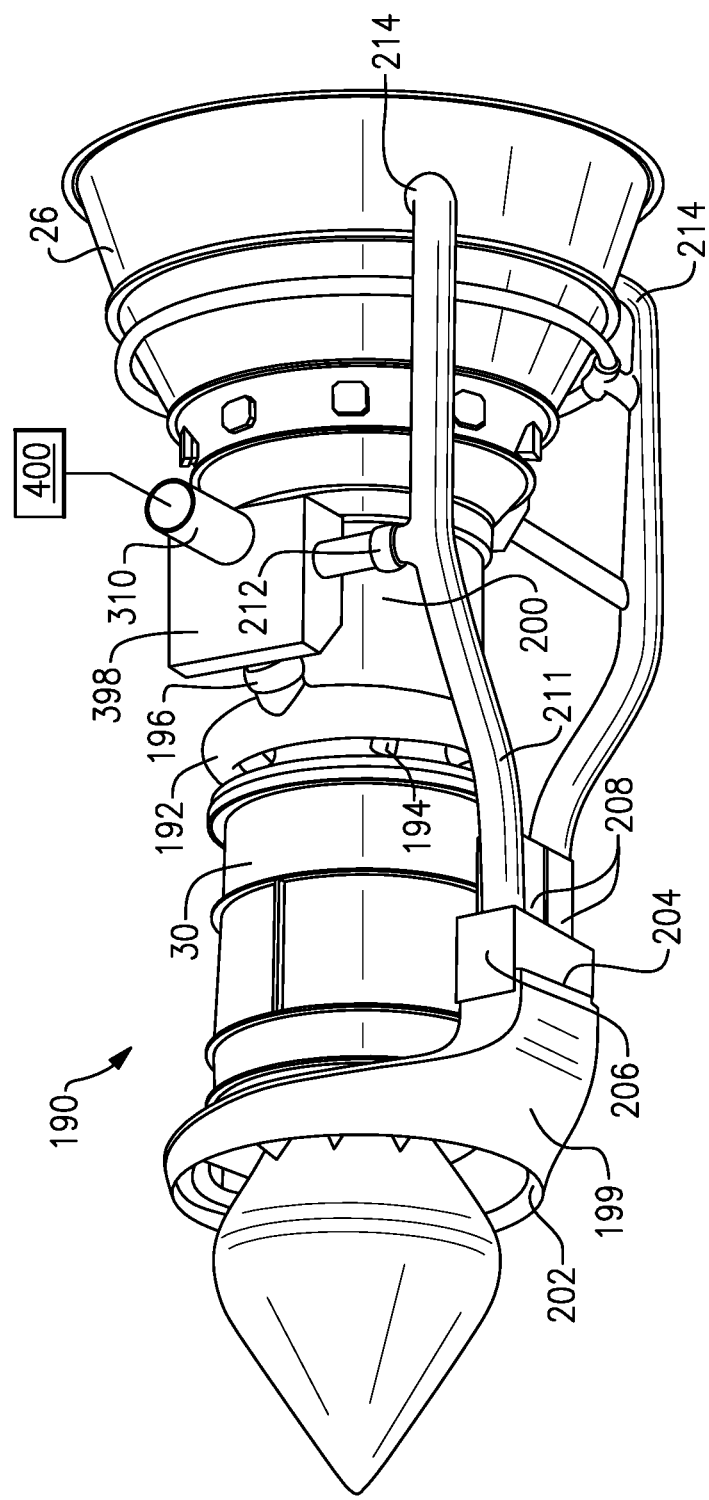
FIG. 3 shows a first embodiment air supply system.
Figure 4:
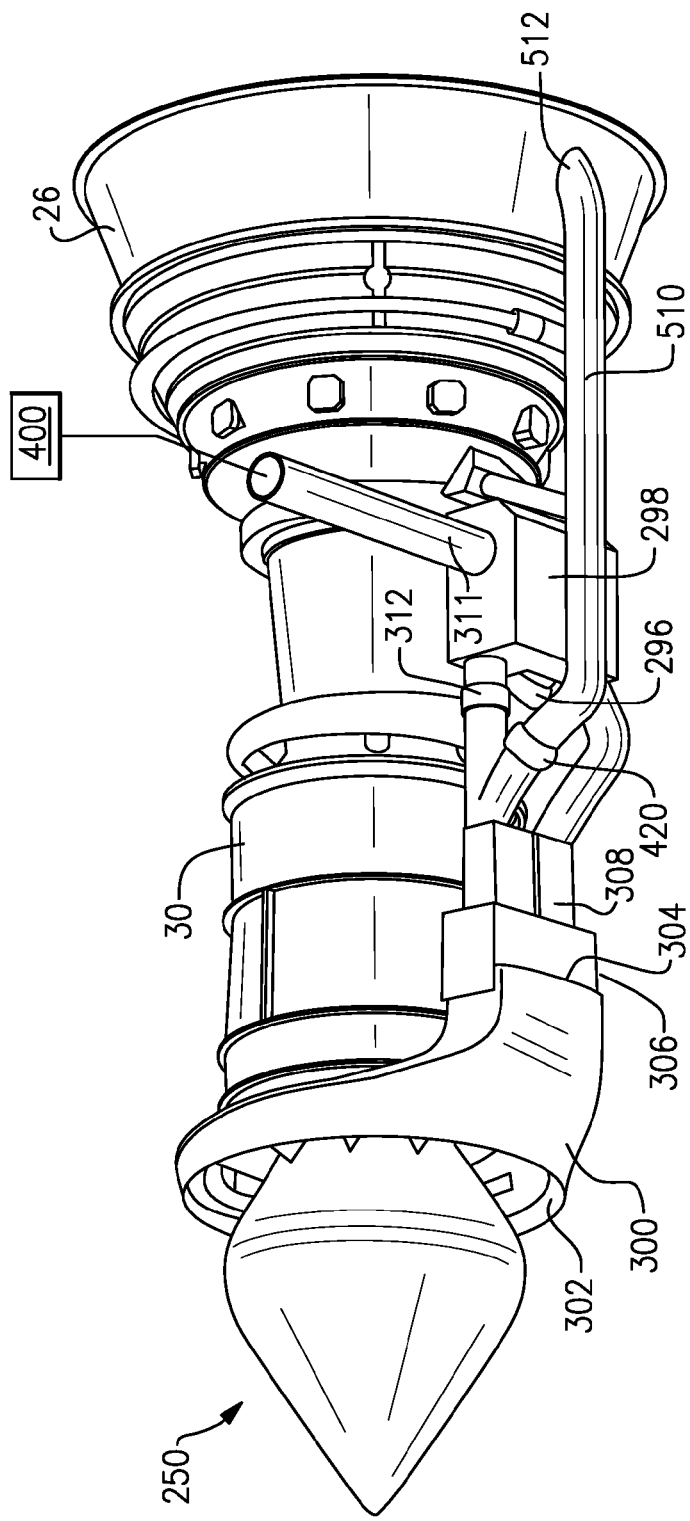
FIG. 4 shows a second embodiment.

Further details of the bleed line or port 40 and an associated air supply system are shown in FIGS. 3 and 4.

Particularly with an engine as disclosed above, the low pressure compressor 30 is supplying a higher pressure than is typically been the case in the past. As such, this compressor can be utilized as a source of air for environmental control systems on an associated aircraft. In the past, a higher pressure source has typically been required resulting in taps from the high pressure compressor.

As shown in FIG. 3, an air supply system 190 incorporates a manifold 192 provided with a plurality of bleed lines or ports 194 and which communicate with an intermediate compressor case 200. The intermediate compressor case 200 is positioned between the low pressure compressor 30 and the high pressure compressor 26.

The pressure of the air supplied by the low pressure compressor 30 will vary dramatically during operation of an associated engine. Thus, at some point, the air pressure delivered from the ports 194 may be undesirably high.

A supply of lower pressure air is used to address this concern. An inlet 202 to a low pressure manifold 199 communicates through a heat exchanger 206. The heat exchanger 206 may be utilized to cool oil at other locations. A particle separator 204 is positioned to filter dirt particles out of an air supply stream being delivered downstream through fans 208 to an air supply line 211. Air supply line 211 may communicate through a valve 212 to a mixing box 398. The valve 212 is controlled in combination with a valve 196 associated with the manifold 192, such that the flow of air from the higher pressure manifold 192 and the lower pressure source 211, are properly mixed to achieve a desired pressure at an outlet 310. The outlet 310 leads to an environmental control system 400 for supplying air for use on an associated aircraft.

A control, such as a full authority digital engine control, may control the valves 196 and 212, based upon the pressure, temperature and any other variables within the operation of the associated engine.

A worker of ordinary skill in the art would recognize how to achieve a desired pressure at the outlet 310. The desired pressure at the outlet 310 may be dictated by the aircraft manufacturer.

When the valve 212 is open, air flows from the source 211 through the mixing box 398. However, as the valve 212 is moved toward a more closed position, that air is delivered through an outlet 214 downstream of the high pressure compressor 26.

FIG. 4 shows an alternative embodiment 250. Alternative embodiment 250 is generally the same as the embodiment 190. An inlet 302 leads into a low pressure supply manifold 300. There is a dirt separator 304, a heat exchanger 306 and fans 308. Valves 312 and 296 are controlled to control the pressure of the air reaching a mixing box 298 which communicates with an outlet 311, and eventually the environmental control system 400. A pipe 510 communicating a lower pressure air supply into the mixing box 298 passes air through a one-way valve 420 and to the outlet 512, similar to the first embodiment.

The particle separator disclosed in FIGS. 1A-1D is particularly beneficial when used in an engine such as disclosed in FIGS. 2A-2B, and providing the additional functions as shown, for example, in FIGS. 3 and 4.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
a first particle separator stage including a surface for:
impacting air at an outer periphery of an air flow passage capturing impacted particles at said outer periphery,
delivering cleaner air into a core engine through a path; and
whereby:
air inward of the first particle separator stage passes towards a core of said engine, and
cleaner air upstream of the second particle separator stage is utilized for an air function at a location other than the core engine, and
a particle discharge is disposed downstream of said second particle separator stage,
wherein a ring provides said first particle separator stage, and extends circumferentially to direct separated particles towards the second particle separator stage, and
wherein said particle separator surrounds a nose cone, with said path into said core engine downstream and radially inwardly of said surface, and outwardly of said nose cone, and said first stage particle separator including a chamber to gather and force particles around a periphery of said first stage particle separator to gather in a location that will be vertically lower in said first stage particle separator.

2. The gas turbine engine as set forth in claim 1, wherein said second particle separator stage is generally located at a location spaced by 180° from a mount surface for an associated gas turbine engine.

3. The gas turbine engine as set forth in claim 1, wherein said cleaner air for said air function passing over an air oil cooler heat exchanger.

4. The gas turbine engine as set forth in claim 1, wherein said cleaner air for said air function passing over an air oil cooler heat exchanger.

5. The gas turbine engine as set forth in claim 4, wherein said particle separator surrounds a nose cone, with a path into said core engine being downstream and radially inwardly of said surface, and outwardly of the surface of said nose cone.

6. The gas turbine engine as set forth in claim 1, wherein said particle separator surrounds a nose cone, with a path into said core engine being downstream and radially inwardly of said surface, and outwardly of the surface of said nose cone.

7. A gas turbine engine as set forth in claim 1, wherein said core engine includes a turbine section, a compressor section and a propulsor section, with there being at least two turbine rotors in said turbine section and a first and second compressor rotor, and a propulsor, with said at least two turbine rotors each driving one of said first and second compressor rotors, and said propulsor not being driven at the same speed as either of said first and second turbine rotors.

8. The gas turbine engine as set forth in claim 7, wherein said propulsor is driven by one of said first and second turbine rotors which is driving a lower stage one of said first and second compressor rotors, and there being a gear reduction between said one of said first and second turbine rotors and said propulsor.

9. The gas turbine engine as set forth in claim 7, wherein said propulsor is driven by a third propulsor turbine rotor, which is positioned to be downstream of said at least two turbine rotors.

10. The gas turbine engine as set forth in claim 7, wherein said second compressor rotor is downstream of said first compressor rotor, and said second compressor rotor having a first overall pressure ratio and said first compressor rotor having a second overall pressure ratio, and a ratio of said first overall pressure ratio to said second overall pressure ratio being greater than or equal to about 2.0.

11. The gas turbine engine as set forth in claim 10, wherein said ratio of said first overall pressure ratio to said second overall pressure ratio is greater than or equal to about 3.0.

12. The gas turbine engine as set forth in claim 11, wherein said ratio of said first overall pressure ratio to said second overall pressure ratio is greater than or equal to about 3.5.

13. The gas turbine engine as set forth in claim 12, wherein said ratio of said first overall pressure ratio to said second overall pressure ratio being less than or equal to about 8.0.

14. The gas turbine engine as set forth in claim 8, wherein the propulsor turbine drives a fan at an upstream end of the engine.

15. The gas turbine engine as set forth in claim 4, wherein said ratio of said first overall pressure ratio to said second overall pressure ratio being less than or equal to about 8.0.

16. The gas turbine engine as set forth in claim 7, wherein the propulsor turbine drives a fan at an upstream end of the engine.

17. The gas turbine engine as set forth in claim 7, wherein an axially outer position is defined by said fan, and said propulsor turbine being positioned between said fan and said first and second turbine rotors, and said first and second compressor rotors being positioned further into said engine relative to said first and second turbine rotors.

18. The gas turbine engine as set forth in claim 7, wherein said propulsor is a plurality of propellers.

* * * * *